United States Patent [19]

Bayer et al.

[11] 3,886,244
[45] May 27, 1975

[54] METHOD FOR PRODUCING BRICKS FROM RED MUD

[75] Inventors: Gerhard Bayer, Ludwigshafen-Rheingonheim; Egon Cherdron, Limburgerhof/Palatinate; Manfred Haerter, Neuhofen/Palatinate; Ernst Hecht, Waldsee/Palatinate, all of Germany

[73] Assignee: Gebr. Giulini GmbH, Ludwigshafen (Rhine), Germany

[22] Filed: Oct. 10, 1972

[21] Appl. No.: 296,316

Related U.S. Application Data

[63] Continuation-in-part of Ser. No. 210,508, Dec. 21, 1971.

[30] Foreign Application Priority Data

Oct. 12, 1971 Germany............................ 2150677

[52] U.S. Cl. ....................... 264/44; 264/56; 264/63
[51] Int. Cl............................................. C04b 33/32
[58] Field of Search ....... 264/56, 44, 330, 333, 332, 264/63; 106/39

[56] References Cited
UNITED STATES PATENTS 3,591,393   7/1971   Rankine............................... 264/44
3,679,441   7/1972   Harvey................................. 264/44

FOREIGN PATENTS OR APPLICATIONS 733,666     3/1943   Germany
1,278,321   9/1968   Germany
1,292,570   4/1969   Germany
1,058,615   2/1967   United Kingdom.................. 264/56
369,181     1/1959   Japan................................... 264/56

OTHER PUBLICATIONS

H. H. Nakamura et al., "Use of Bauxite Wastes for Lightweight Building Products," Ceramic Bulletin, March, 1971, pp. 248–250.

*Primary Examiner*—Donald J. Arnold
*Attorney, Agent, or Firm*—Spencer & Kaye

[57] ABSTRACT

A method for producing bricks from red mud, including mixing filter-wet red mud with a water-fixing substance, then mixing the mixture of red mud and water-fixing substance with clay to provide a resulting mixture containing 50 to 92 weight percent red mud based on the dry weight of red mud plus clay, and water-fixing substance, forming the resulting mixture into raw bricks, drying the raw bricks with heated gases at a temperature below 70°C, and firing the dried raw bricks at a temperature between 900°–1,100°C.

7 Claims, No Drawings

METHOD FOR PRODUCING BRICKS FROM RED MUD

CROSS-REFERENCE TO RELATED APPLICATION

This is a continuation-in-part of our U.S. application Ser. No. 210,508 filed Dec. 21, 1971, for a "Method for Producing Bricks from Red Mud."

BACKGROUND OF THE INVENTION

The present invention relates to a method for making bricks, particularly light-weight construction bricks, from red mud in which strongly water-fixing organic or inorganic substances are added to the filter-wet red mud before processing in order to influence its consistency.

Our above-noted application Ser. No. 210,508 discloses processing red mud in mixture with clay to produce shape-retaining non-efflorescent bricks, and that disclosure is incorporated herein by reference. The red mud is initially dried to a residual moisture content of 15 to 35 weight percent, preferably 20 to 25 weight percent, and subsequently mixed with clay, the resulting mixture containing 50 to 92 weight percent, preferably 70 to 90 weight percent, red mud based on the dry weight of the resulting mixture.

Using the method disclosed in that earlier application, the resulting mixture can easily be molded and the final bricks have perfect quality. One drawback of the method is, however, that additional apparatus is required for drying the red mud.

It is further known from "Ceramic Bulletin," Vol. 50 (1971) No. 3, to foam red mud mechanically in mixture with clay, perlite and foaming agents and in this way obtain a moldable consistency. Molding in extrusion presses, however, is not possible with this method. Moreover, the resulting strength values are so low that the method has no significance for industrial application.

SUMMARY OF THE INVENTION

An object of the present invention, therefore, is to provide a method for making red mud bricks of satisfactory strength without requiring drying of filter-wet red mud.

This as well as other objects which will become apparent in the discussion that follows are achieved, according to the present invention, by a method for producing bricks from red mud, including mixing filter-wet red mud with a water-fixing substance, then mixing the mixture of red mud and water-fixing substance with clay to provide a resulting mixture containing 50 to 92 weight percent red mud based on the dry weight of red mud plus clay and water-fixing substance, forming the resulting mixture into raw bricks, drying the raw bricks with heated gases at a temperature below 70°C, and firing the dried raw bricks at a temperature between 900°– 1,100°C.

DESCRIPTION OF THE PREFERRED EMBODIMENTS

The present invention is based on the discovery that the method according to the above-noted application Ser. No. 210,508 can be improved in a simple manner by adding water-fixing inorganic and/or organic substances to the filter-wet red mud. The consistency of the red mud is surprisingly changed by the addition of the water-fixing substances in such a manner that it can be mixed with clay without any further procedures — particularly without pre-drying — and can be processed into raw bricks in extrusion presses. The added quantity of water-fixing substances is 5 to 30 weight percent, based on the dry weight of the red mud, depending on the water-absorption capability of the substance, but preferably lies at 10 to 25 weight percent. For reasons of economics, the water-fixing substance can be added to the red mud directly in the red mud discharge apparatus that transports the red mud away from the filter on which it has been collected. That is, the water-fixing substance is mixed with the red mud directly after the filtration process. The size of the added particles should not exceed 4 mm, but advantageously the size is a maximum of 2 mm. Here, mm = millimeters. The particle size has no lower limit; that is, as fine a particle size as may be produced is usable.

The inorganic substances may be bentonite, silica gel, alumina gel, and the like. The preferred organic substances are cork, peat, sawdust, coal dust, paper and textile waste, or mixtures of these substances. It is also possible to use dried red mud as the water-fixing material.

The realization that, in spite of the addition of water-fixing organic and/or inorganic substances, it is possible to produce fired (or burned) bricks, particularly light-weight construction bricks, from red mud was completely surprising and not predictable. The addition of such materials in the manufacture of light-weight construction bricks or to the conventional raw materials for bricks is considered to be technically unfeasible by the brick-making industry. Reference is made in this connection to German Pat. No. 1,126,302 according to which the addition of water-fixing materials leads to destruction of the bricks due to the suddenly occurring development of vapors. For this reason it is proposed in this German Pat. No. 1,126,302 to add only such materials to the raw material as absorb little or no water for example foamed plastics with closed pores. Red mud, therefore, seems to differ substantially in its behavior from the properties of the raw materials usually employed in the brick-making industry.

The bricks produced according to the method of the present invention are compared with bricks of German Pat. No. 1,126,302 as follows:

1) Bricks of red mud according to the present invention:
    bulk density      compressive strength
    0.85 g/cm³      188 kiloponds/cm²
    0.90    "      230    "
    0.95    "      302    "
2) Bricks according to German Patent No. 1,126,302:
    bulk density      compressive strength
    0.80 g/cm³      120 kiloponds/cm²
    0.95    "      190    "

$$\text{"Bulk density"} = \frac{\text{mass}}{\text{bulk volume}} = \frac{\text{mass}}{\text{true volume} + \text{total pore volume}}.$$

In large scale practical use it has been found that the performance of the method according to the present invention permits faultfree molding in spite of the higher water content inherent in using filter-wet red mud. Moreover, very good green strength is obtained. Shrinkage cracks and spalling were observed neither in drying nor in firing. The micropores produced in the firing process through combustion of the organic materials permit the manufacture of light-weight bricks. The resulting combustion heat serves as an additional energy source.

The method according to the present invention permits red mud, an annoying waste product from the manufacture of aluminum, to be economically utilized and thus prevents the pollution of the environment.

The following examples serve to illustrate the present invention in further detail.

EXAMPLE 1

Two-hundred kilograms/minute of filter-wet red mud having a water content of 39.6 weight percent, based on the wet weight of the red mud, were produced on a rotary vacuum filter. This red mud was transported away from the filter in a screw conveyor.

In this screw conveyor, 30 kg of waste cork meal per minute with a maximum particle size of 2 mm. were measured out into 200 kg per minute of filter-wet red mud. During the transporting over a path of 15 meters in length and a residence time of 1 to 1.5 minutes, the two components, red mud and cork meal, were well mixed. The mixture left the screw conveyor in a crumbly, easily transportable form.

Fifty metric tons of this material were subsequently thoroughly mixed with 7.5 metric tons of clay, fed into an extruder and there shaped into raw bricks under a pressure of 8 atmospheres gage pressure. The raw bricks were dried for 24 hours in a tunnel dryer at a temperature of 45°C. Formation of cracks was not noted. The raw bricks having a residual water content of 4 weight percent, based on the wet weight of the raw bricks, were placed into a round-chamber kiln and fired for 20 hours at a temperature between 980° and 1,000°C. Spalling or shrinkage cracks did not occur. The thus-burnt bricks had a bulk density of 0.95 kg/dm$^3$ and a compressive strength of 258 kg/cm$^2$, where kg = kilograms, dm = decimeters, and cm = centimeters.

EXAMPLE 2

In the screw conveyor described in Example 1, 20 kg of completely dried red mud per minute were added to a 200 kg per minute flow of the same filter-wet red mud. On the conveying path thorough mixing of the two components was effected and the mixture was discharged from the screw conveyor in a crumbly consistency.

Twenty-five metric tons of this material were mixed with 5.4 metric tons waste clay and shaped into raw bricks in an extruder at a gage pressure of 9 atmospheres. The drying was effected in a tunnel dryer at a temperature of 52°C over a period of 22 hours, the resulting molded product here also being without cracks and well shape-retaining.

The raw bricks having a residual water content of 3 weight percent were then placed into a round-chamber furnace and fired for 20 hours at a temperature of 1,000° to 1,020°C. The product was free from shrinkage cracks and spalling. The burnt bricks had a bulk density of 1.25 kg/dm$^3$ and a compressive strength of 510 kg/cm$^2$.

EXAMPLE 3

In the screw conveyor of Example 1, 50 kg/min. of fine fly ash were added to 200 kg/min. of the same filter-wet red mud, where min. = minutes. The two materials were thoroughly mixed on the conveying path and the mixture left the screw conveyor with a grainy structure.

Twenty-five metric tons of this mixture were mixed with 4 metric tons clay and shaped in an extruder into shape-retaining raw bricks at a gage pressure of 8.5 atmospheres. The raw bricks were dried in a steam-heated drying chamber for 15 hours at a temperature of 60°C to obtain, without cracking, a residual water content of 1.2 weight-percent. In a subsequent firing for a time of 20 hours in a round-chamber kiln whose interior temperature was 1,000°–1,020°C, neither shrinkage cracks nor spalling was observed. Testing of the burnt bricks showed a bulk density of 1.08 kg/dm$^3$ and a compressive strength of 387 kg/cm$^2$.

As will be apparent from the above, the broader aspects of the present invention lie in the discovery that, by mixing filter-wet red mud with a water-fixing substance, high quality red mud bricks may be obtained without first drying the filter-wet red mud down to the residual water content of 15 to 35 weight percent disclosed in the above-noted application Ser. No. 210,508. Ancillary matters, such as exemplary clay, extruder, and the like, are contained in the referenced application Ser. No. 210,508.

The preferred range of water contents in filter-wet red mud used in the present invention are between 35–50 weight percent water based on the wet weight of the red mud.

To select the proper amount of water-fixing substance, which is a function of the water content, the iron oxide content and the content of the other different impurities, wet red mud and water-fixing substances are mixed in different ratios and these mixtures were than tested on a laboratory equipment. The molded test-bricks are dried and fired as described before. The fire time could be between 5 and 20 hours and depends on the firing equipment.

It will be understood that the above description of the present invention is susceptible to various modifications, changes and adaptations, and the same are intended to be comprehended within the meaning and range of equivalents of the appended claims.

We claim:

1. A method for producing bricks from red mud, comprising mixing filter-wet red mud containing between 35 to 50 weight percent water, based on the wet weight of the red mud, with from 5 to 30 weight percent, based on the dry weight of the red mud, of a water-absorbing substance which is at least one substance selected from the group consisting of fly ash, silica gel, alumina gel, cork, peat, sawdust, coal dust, paper waste and textile waste, then mixing the mixture of red mud and water-absorbing substance with clay to provide a resulting mixture containing 50 to 92 weight percent red mud based on the dry weight of red mud plus clay, plus water-absorbing substance, forming said resulting mixture into raw bricks by extrusion pressing, drying the raw bricks to a residual water content of about 1.2 to 4.0 weight percent, based on the wet weight of the raw brick, with heated gases at a temperature below 70°C, and firing the dried raw bricks at a temperature between 900°–1,100°C.

2. A method as claimed in claim 1 wherein the water-absorbing substance has a maximum particle size of 4 millimeters.

3. A method as claimed in claim 2 wherein the water-absorbing substance is mixed with the red mud directly after filtration.

4. A method as claimed in claim 1 wherein, based on the dry weight of the red mud, 10 to 25 weight percent water-absorbing substance is mixed with the filter-wet red mud.

5. A method as claimed in claim 4, wherein the water-absorbing substance has a maximum particle size of 2 millimeters.

6. A method as claimed in claim 1, wherein the filter-wet red mud contains 39.6 weight percent water, based on the wet weight of the red mud, the water-absorbing substance is cork meal, mixed with the red mud in the ratio filter-wet red mud to cork meal of 200kg/30kg, the mixture of red mud and cork meal is mixed with clay in a ratio of 50 tons of mixture to 7.5 tons of clay, forming is at 8 atmospheres gage pressure, drying is at 45°C for 24 hours to a residual water content of 4 weight percent, based on the wet weight of the raw bricks, and firing is at 980 to 1,000°C for 20 hours.

7. A method as claimed in claim 1, wherein the filter-wet red mud contains 39.6 weight percent water, based on the wet weight of the red mud, the water-absorbing substance is fly ash mixed with the red mud in the ratio red mud to fly ash = 200kg/50kg, the mixture of red mud and fly ash is mixed with clay in a ratio of 25 tons of mixture to 4 tons of clay, forming is at 8.5 atmospheres gage pressure, drying is at 60°C for 15 hours to a residual water content of 1.2 weight-percent, based on the wet weight of the raw bricks, and firing is at 1,000° to 1,020°C.

* * * * *